United States Patent [19]

DeLuca et al.

[11] Patent Number: 4,860,005
[45] Date of Patent: Aug. 22, 1989

[54] COMMUNICATION RECEIVER WITH AUTOMATIC TURN ON/OFF

[75] Inventors: Joan S. DeLuca; Randi L. Dulaney, both of Boca Raton, Fla.

[73] Assignee: Motorola, Inc., Schaumburg, Ill.

[21] Appl. No.: 141,458

[22] Filed: Jan. 7, 1988

[51] Int. Cl.$^4$ .......................... H04Q 7/02; H04B 1/16
[52] U.S. Cl. ..................... 340/825.440; 340/825.470; 340/825.480; 340/309.400; 455/231; 455/343
[58] Field of Search ...................... 340/825.44, 825.22, 340/825.26, 825.27, 825.47, 825.48, 309.1, 309.4, 311.1; 379/105, 104, 102; 455/231, 228, 230, 343; 370/95; 368/10

[56] References Cited

U.S. PATENT DOCUMENTS

| | | | |
|---|---|---|---|
| 3,593,148 | 9/1969 | Commings | 455/231 |
| 4,081,754 | 3/1978 | Jackson | 340/309.4 |
| 4,271,432 | 6/1981 | Suzuki et al. | 455/231 |
| 4,325,081 | 4/1982 | Abe et al. | 340/309.4 |
| 4,403,344 | 9/1983 | Yamada et al. | 455/231 |
| 4,449,248 | 5/1984 | Leslie et al. | 455/231 |
| 4,577,315 | 3/1986 | Otsuka | 370/95 |

FOREIGN PATENT DOCUMENTS

| | | | |
|---|---|---|---|
| 0106237 | 6/1985 | Japan | 340/825.44 |
| 0251262 | 11/1986 | Japan | 379/105 |

Primary Examiner—Donald J. Yusko
Assistant Examiner—Eric O. Pudpud
Attorney, Agent, or Firm—William E. Zitelli; Michael J. DeLuca; Vincent B. Ingrassia

[57] ABSTRACT

A communication receiver is disclosed which can turn itself on or off depending upon the time of day. When the receiver is on, normal battery saving is performed. A time of day clock generates a time signal which is compared to predetermined turn on and turn off times. The turn on and turn off times may be permanently stored in memory or may be manually programmed at the receiver or may be received by the receiver and stored in a reprogrammable memory.

26 Claims, 9 Drawing Sheets

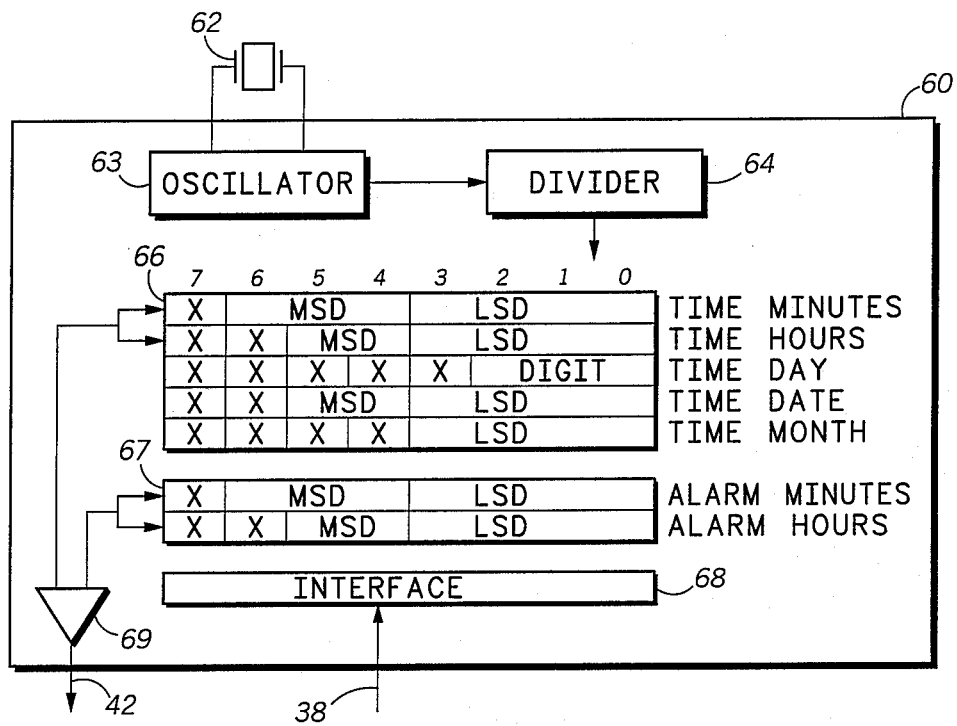
FIG.3
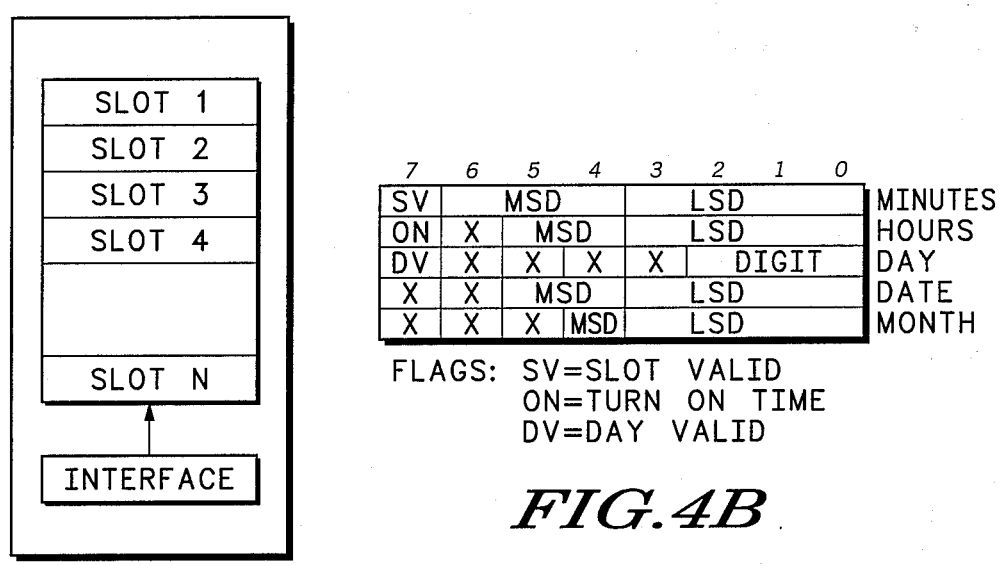
FIG.4A
FIG.4B

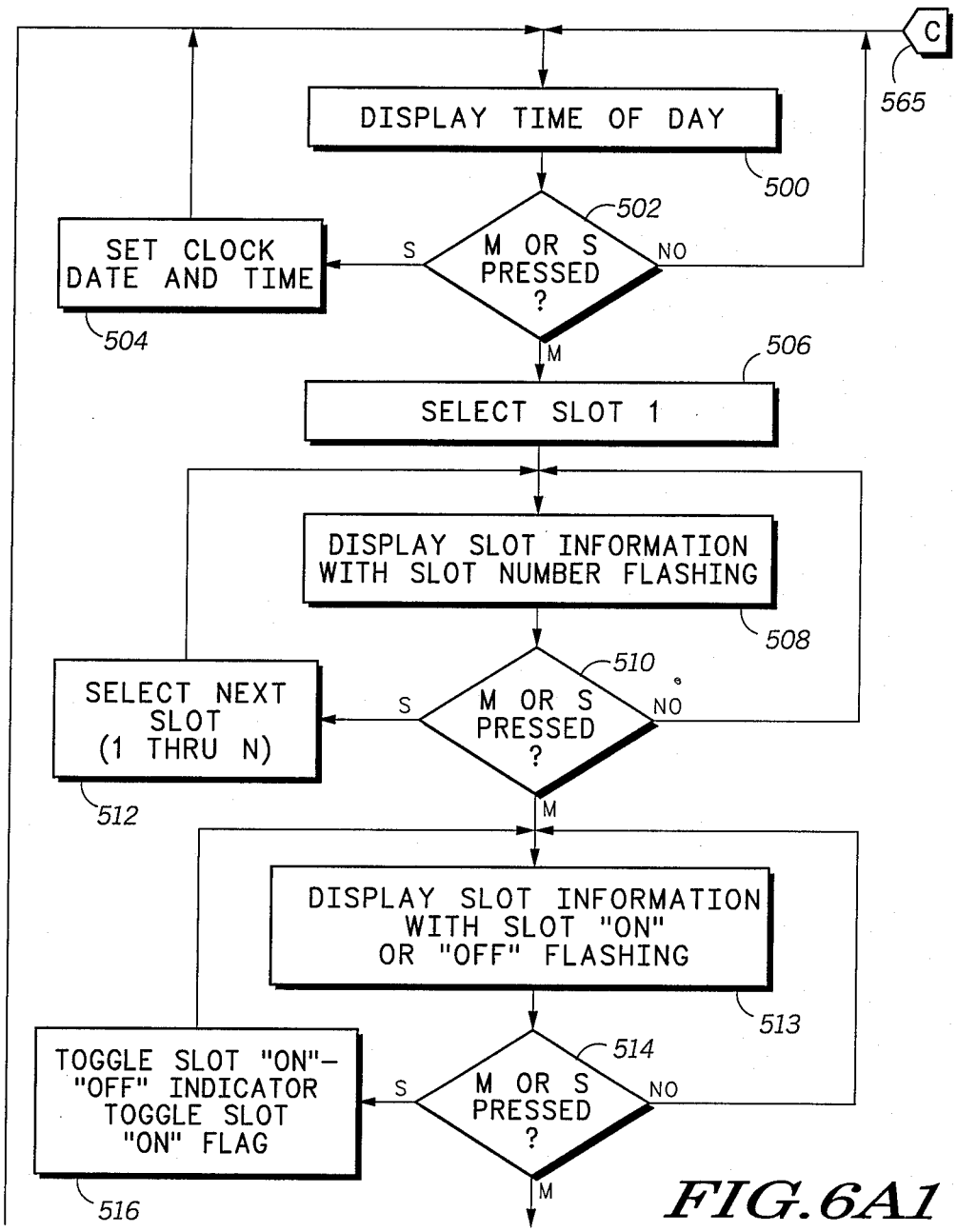

FIG.6A2

COMMUNICATION RECEIVER WITH AUTOMATIC TURN ON/OFF

BACKGROUND OF THE INVENTION

This invention relates generally to the field of battery saving in a portable communication device and more particularly to enabling and disabling normal pager receiver operation based upon a time of day, day of week, and/or date parameters.

With the advent of reduced current drain circuitry, improved battery saving operations, and higher capacity primary batteries, the battery life of a pager has been extended to several months. This longer life has insensitized some users to the limited battery life of their pager. Consequently, users neglect to regularly turn off their pagers after work or when they are not available for paging, such as when they are out of range of the transmitter. Even with the various technical improvements, such neglect substantially reduces the life of the battery.

Similarly, pager users who remember to switch their pagers off at the end of a working day occasionally forget to switch their pagers back on at the beginning of the next working day. During the working day, the pager user could be wearing their pager and expecting to receive pages when the pager is actually switched off. This occasionally results in missed pages.

Because many pager users are only available for paging at regular times, a time of day clock can be used to extend the life of the battery by inhibiting receiver operations at the regular times when the user knows that he will not be receiving pages. Additionally, a source of missed pages can be eliminated by switching a pager on at the regular times when the user expects to receive pages. Such a device would automatically turn off and on the pager to overcome the user neglect and occasional missed pages.

Often times, a single address function will be assigned to several pager users. When one group of pager users is on duty, they are to respond to the messages. The off duty group will also receive the message if their pagers are left turned on. Often times, it is undesirable for the off duty group to be receiving messages. Prior art descriptions of battery saver suggest no solution to the inhibition of page reception by off duty users.

DESCRIPTION OF THE PRIOR ART

Crude clocks in paging type devices have been described. In one implementation, a clock and the battery saver interval timer have shared a common oscillator as a time base. The clock divides the oscillator frequency, thereby generating a signal corresponding to the time of day. The battery saver interval time independently uses the oscillator time base in order to generate a periodic battery saving interval for receiver operation. The oscillator controls the receiver operation by turning on at fixed intervals such as five minutes out of every fifteen minutes. However, these devices do not attempt to account for the regular usage habits of the pager user. They also do not selectively inhibit reception of paging message information.

SUMMARY OF THE INVENTION

This invention is a method and apparatus for activating and deactivating a selective call receiver at predetermined times based upon a comparison with local time information generated by an internal clock. The receiver and clock are resident within a portable communication device. The receiver will turn on at a predetermined time and off at a predetermined time. The time may be dependent upon the time of day, day of the week, and/or the date. In a typical application, the device would be programmed to turn on at 8:00 AM and off at 5:00 PM, Monday through Friday, and the receiver would be off Saturday and Sunday.

In another application, it is desirable to inhibit the reception of paging information at predetermined times by inhibiting power to a paging receiver. Such an application allows several users to be assigned a common paging address function by selectively inhibiting groups of pagers at predetermined times. Thus, for example, an emergency page would only be received by users who are on duty and selected to receive the emergency message at the time that the message was sent. Such a message, if sent at a different time, would be received by different users. The inhibition of pages at predetermined times also insures that a pager user will not be responding to messages during the predetermined time interval.

Additionally, this invention provides alerts upon execution of a power on time or a power off time. These alerts inform the user of the change in operating mode of the pager.

Since a pager may be programmed to power off at a regular time, and since some users occasionally are on duty longer than their regular hours, a mode is provided that warns the user of the impending power off condition and allows the user to override power off condition. This override sequence occurs without interruption of the receiving process. Also, in this mode, the user may terminate the alert, thereby turning the receiver off, or if no action is taken, the receiver will turn off at the end of the alert. For example, a pager programmed to turn off at 5:00 PM would begin a chirp alert at 5:00 PM. The chirp alert can be 500 ms tone burst every ten seconds. If after two minutes of chirp alert no manual action is taken, the receiver switches off. If during the two-minute interval an alert reset button is pressed, the chirp alert stops and the receiver switches off. However, if during the two-minute chirp alert a power on/off button is pressed, the chirp alert stops and the receiver remains on, thereby overriding the power off time. The receiver remains on until a subsequent power off time.

It is therefore an object of the present invention to provide predetermined turn on and turn off times and days and/or dates for the receiver in a programmable read only memory. These turn on and turn off times would be programmed when the pager is first configured for use at which time, system parameters such as address information and other options are also configured.

It is yet another object of the present invention to provide for a paging receiver with turn on and turn off times that may be programmed by the user of the pager using control buttons on the pager. It is yet another object of the present invention to provide for pager turn on and turn off times that may be programmed over the air by a paging terminal, thereby allowing the turn on and turn off times to be programmed by the paging system operator at the paging terminal or the pager user over a telephone interface to the paging terminal. The paging terminal sends a selective call address followed by the information required to add, delete, or modify the turn on and turn off times of the pager.

It is yet another object of the invention to generate an alert when the receiver power state switches from on to off and from off to on when the switch is based upon the time of day.

It is yet another object of this invention to provide an interval upon execution of a power off time wherein the receiver remains on and the user is alerted of the impending receiver power off condition. During this interval, the user may manually override the impending receiver power off condition, thereby keeping the receiver on until a subsequent power off time. Additionally, during this interval, the user may manually reset the alert, thereby powering off the receiver or the receiver will power off at the completion of the interval.

BRIEF DESCRIPTION OF THE DRAWINGS

Features of the invention which are believed to be novel are set forth with particularity in the appended claims. The invention itself, however, together with its further objects and advantages thereof, may be best understood by reference to the following description when taken in conjunction with the accompanying drawings

FIG. 3 shows a detailed diagram of the time of day clock and alarm.

FIG. 4A shows a table of turn on time and turn off time slots in the reprogrammable nonvolatile paging system program memory.

FIG. 4B shows the 5 byte register structure containing the hours, minutes, day of week, date and month and associated flags of each of the slots.

FIG. 5A shows the pager operation when the receiver is on.

FIG. 5B shows the interrupt routine which changes mode between the receiver on and receiver off conditions.

FIG. 5C shows the pager operation when the receiver is off.

FIG. 5D shows the pager operation during the power off override operation.

FIGS. 6A and 6B are flow charts of the manual reprogramming of the turn on and turn off times by the user of the paging device.

DESCRIPTION OF THE PREFERRED EMBODIMENT

For purposes of description of the preferred embodiment and ease of understanding of the present invention, it is convenient to choose the one-way selective call message and communication system known as paging. A paging receiver described in the invention turns on at certain times of the day and turns off at other times of the day. When the receiver is on, it performs normal battery saving operations. The paging receiver may be configured to receive and decode either POCSAG, Golay, 5-tone or other encoding techniques. When the receiver is on, battery saving operation in any of the signalling systems is well known to those skilled in the art. When the receiver is off, the receiving functions are disabled for the entire duration of the off interval.

Figure 1:
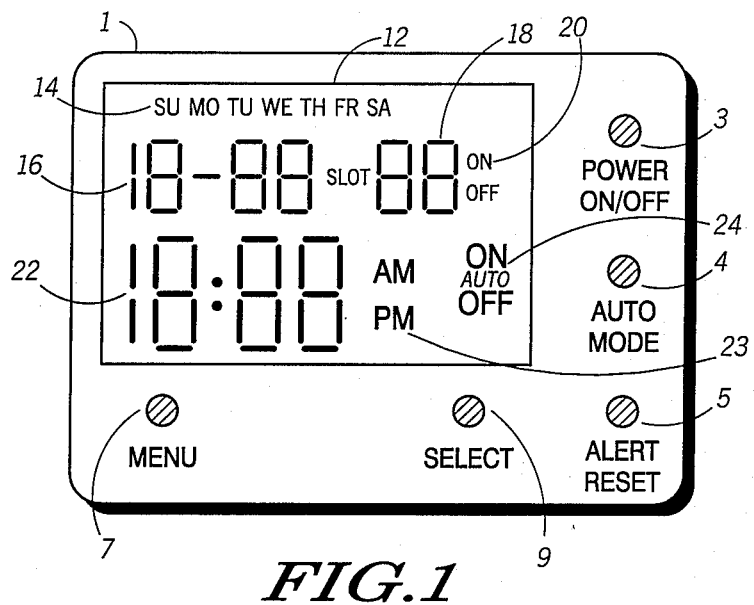
FIG. 1 shows an illustration of a paging device with a display for showing the time of day and the turn on and turn off times as well as necessary control buttons for the description of the invention.

FIG. 1 is an illustration of the paging device as viewed by the user. The paging device 1 comprises a five button switch means: a power on/off button 3, an auto mode button 4, an alert reset button 5, a menu button 7, and a select button 9. The power on/off button 3 allows the user to change the mode of operation. If the pager is on, pushing the power on/off button 3 turns the pager off. If the pager is off, pushing the power on/off button 3 turns the pager on. When a page is received, an alert signal is generated, pushing the alert reset button 5 during the alert terminates the alert signal. The menu 7 and select 9 buttons allow the user to change the clock time and the turn on and turn off times. The operation of the pager turning on or off at predetermined times is enabled and disabled by the auto mode button 4..

The paging receiver display means comprises a display 12. The upper line of the display 14 contains seven two-letter initials indicating the day of the week. The two-letter initials range from Sunday (SU) through Saturday (SA) and are activated to indicate the day of the week. The second line of the display contains a three and one half digit date display 16 containing one and a half digit month and a two-digit date. A month and date are separated by a dash.

A slot represents a turn on or turn off time. A pager may have a number of slots or turn on/turn off times. Slots are numbered successively beginning from 1. Each slot occupies an area in pager memory and completely describes a turn on or turn off time. The second portion of the second line contains turn on or off slot information. The slot information section contains a two-digit slot number 18 as well as an "on" or "off" annunciator pair 20. The third line of the display contains two sections; the first section indicates time of day 22. It contains a one and a half digit hour display and a two-digit minute display as well as an AM/PM annunciator 23. The second part of the third line contains a pager status 24 which consists of an "on" and an "off" annunciator pair as well as an "auto" annunciator. The "on" annunciator is activated when the receiver is on, and the "off" annunciator is activated when the receiver is off. Note that when the receiver is on, normal battery saving is performed. The "auto" annunciator is activated when turn on and turn off time function is activated allowing the pager to automatically turn on or off at predetermined times. The annunciator is blanked when this function is deactivated. For the purposes of the present invention, it is easiest to review the paging receiver in this minimal form so that the operation of the invention can be clearly understood. However, any number of variations and additional operations and displays may be added to the paging device.

Figure 2:
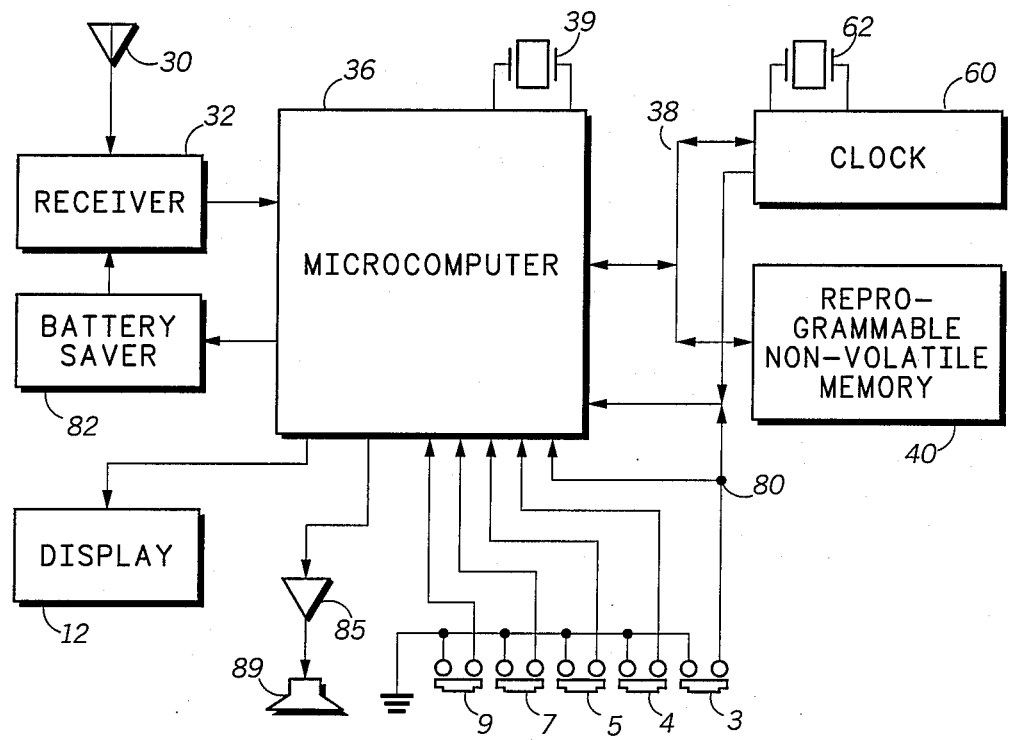
FIG. 2 shows a functional block diagram of the device employing the present invention.

FIG. 2 is a functional block diagram of the receiving device employed in the present invention. The receiving means comprise an antenna 30 coupled to a receiver 32. Receiver 32 detects and demodulates signals transmitted from a remote location over a radio frequency communications link. In operation, receiver 32 may use any of a number of frequency tuning techniques including crystal channel elements or digitally synthesized frequency dividers and employ any of a number of modulation/demodulation formats including amplitude modulation or frequency modulation. For the purpose of the present invention, it is easiest to treat the receiver as a well known frequency modulated (FM) receiver which includes three elements to accurately tune and detect the frequency modulated information. However, any number of types of other receivers may be used to generate appropriate detected RF signals for analysis. The output of receiver 32 is coupled to a microcomputer controller 36 which functions include a comparison means, a power control means, and an alert generating means. While the term microcomputer is utilized, it will be appreciated by one of ordinary skill in the art that a number of custom programmable logic circuits can be utilized which uses the same controlling function. For purposes of describing the preferred embodiment, the implementation of the receiver device employing the invention will be by firmware stored in a memory portion of the microcomputer 36. Microcomputer 36 includes a common bus line 38 which is used to couple it to a variety of additional devices. Any of a number of microcomputers would be suitable, but a preferred device is the MC68HC05L6 microcomputer manufactured by Motorola, Inc.

The microcomputer 36 derives its timing sequence for battery saving and decoding operation from a crystal 39. The microcomputer 36 is coupled through the common bus line 38 to a memory means, such as a reprogrammable nonvolatile memory 40, whose operation includes a setting means as described in U.S. patent application Ser. No. 07/116,948 entitled "System for Off-the-Air Reprogramming of Communications Receivers" filed by Davis et al. which is hereby incorporated by reference. The reprogrammable nonvolatile memory comprises elements 40–52 of said application. The common bus line 38 is also coupled to a timekeeping means, such as a time of day clock and alarm 60 which is preferably an MC68HCT1 integrated circuit manufactured by Motorola, Inc. Additionally, the time of day clock 60 is connected to the microcomputer 36 via an interrupt line 80. The microcomputer 36 also interfaces to a liquid crystal display 12. The microcomputer 36 contains the necessary circuits to provide the drive voltages for the display 12. A power control means, such as battery saver circuit 82, is coupled to the microcomputer 36 and controls the battery save operation of the receiver section when the receiver is selected to be on. Also coupled to microcomputer 36 are the power on/off switch 3, the auto mode switch 4, the alert reset switch 5, the menu switch 7, and the select switch 9. These switches are connected to the microcomputer's parallel I/O port. Additionally, the power on/off switch 3 is connected to the interrupt line 80 for interrupting the microcomputer. Additionally, the microcomputer 36 interfaces to an audio amplifier 85 and speaker 89 for generating alert signals.

FIG. 3 shows a detailed diagram of the time of day clock. The operation time of day clock 60 is well known to one of ordinary skill in the art and described in readily available publications. The time base for the clock is established by a crystal 62 which is driven by an oscillator circuit 63. The oscillator frequency is divided to a clock frequency by divider 64 which drives a set of registers 66 indicating clock time. The first register of 66 contains minutes information in most significant digit (MSD) and least significant digit (LSD) form. The second register of 66 contains hour information in MSD, LSD form. The third register of 66 contains one-digit day of week information, and the fourth and fifth registers of 66 contain date and month information in MSD, LSD form. Register pair 67 contains minutes and hour alarm information in MSD, LSD form. Bits designated with an "X" in register sets 66 and 67 are "don't cares" and contain no useful information. The microcomputer may read or write register sets 66 and 67 through the interface 68 and interface bus 38. A comparison means, such as comparator 69, generates an interrupt signal on the interrupt line 42 when the hours and minutes registers of the clock time register 66 equal the corresponding alarm hours and minutes registers 67.

FIGS. 4A and 4B show a table of slots comprising turn on and turn off times used by the pager. The table is part of the reprogrammable nonvolatile paging memory 40. It should be appreciated that this memory could also be one time programmable without impacting the basic operation of the invention. The table contains a number of slots 1 through N as shown in FIG. 4A. Each slot is either a turn on or turn off time. FIG. 4B shows the register structure of each slot. Each slot contains five registers which completely defines a turn on or turn off time to be used by the pager.

10 Referring to FIG. 4B, the first register of a slot contains a slot valid (SV) flag in bit 7 and minutes information. When the SV flag is set, the information contained in that slot is a valid turn on or turn off time. When the slot is cleared, the information contained in the slot is not valid and should not be used by the processor. The minutes information is contained in bits 6 through 0 of the first register in MSD and LSD form. The second register in the slot contains an ON flag and hours information. The ON flag, bit 7 of the register, is set if the time contained within the slot is a turn on time. Bit 7 being clear indicates the slot contains a turn off time. Bits 5 through 0 contain the hour of the slot time in MSD, LSD form. The third byte of the slot contains a day valid (DV) flag and a day of week digit. The DV flag indicates that the day of week information is to be used in determining the slot time. The day valid flag being clear indicates that the month and date information are to be used in determining the slot time. The DV flag is bit 7 of the third register. The day of week information is contained in bits 2 through 0 of the third register indicating the appropriate day for the turn on or turn off time. A value of 1 in this location indicates Sunday, and going through to a value of 7 in this location which indicates a Saturday. A value of 0 in this location indicates that "none" of the days are selected. The fourth register in a slot contains date information in MSD, LSD form. The fifth and last register of the slot contains month information in MSD, LSD form. The information in the fourth and fifth registers are used if the DV flag is clear, while the day of week information in register 3 is used if the DV flag is set. Note that aside from the three flags in bit 7 of the first three registers in this figure, the minutes, hours, day of week, date and month registers operate identically to the corresponding register set 66 in FIG. 3, thus allowing for a direct comparison of the information contained in the clock with the turn on or turn off time information contained within the slots.

Figure 5A:
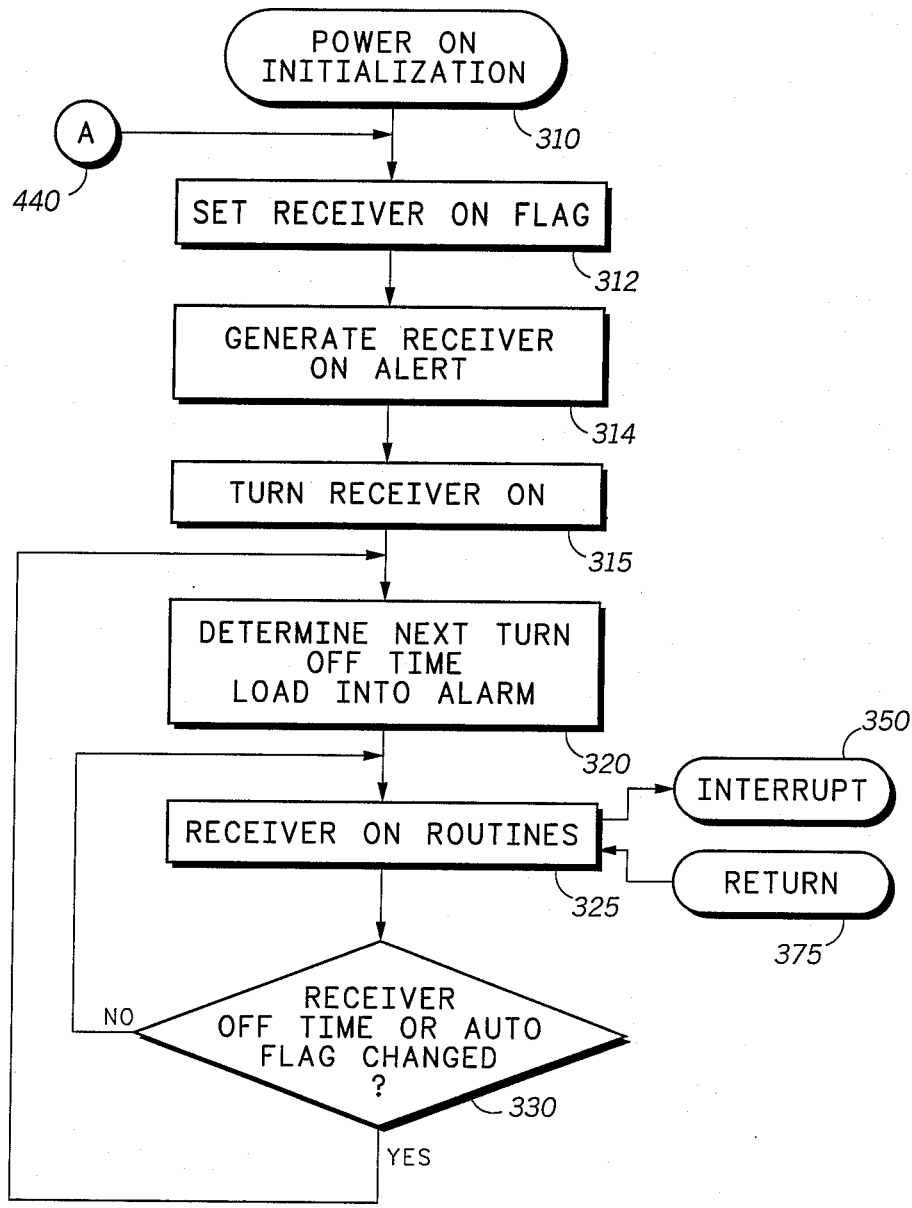
FIGS. 5A, 5B, 5C, and 5D show the overall flow chart operation of the pager.

FIGS. 5A, 5B, 5C, and 5D show the overall pager operation in the receiver on and receiver off modes as well as the interrupt routine which switches between modes. FIG. 5A is a generalized flow chart of the receiver on mode. When the battery is first installed in the pager, a power on initialization routine 310 is performed. Power on initialization includes initializing I/O ports of the microcomputer and other housekeeping functions well known to one of ordinary skill in the art and necessary for proper operation of the microprocessor and the paging receiver. The receiver ON flag is set, step 312, a short receiver on alert tone is generated, step 314, the receiver is then turned on, step 315, and battery saver operation is enabled. Battery saver operation is dependent upon the signal decoding format operating within the microcomputer and is well known to one of ordinary skill in the art. Next, step 320 determines the next turn on/turn off time and loads to the alarm. During this step, the program scans the turn on and turn off slots in the reprogrammable nonvolatile memory 40 and determines the number of minutes to the occurrence of the time contained within each turn off slot. Algorithms for determining the number of minutes to the next turn off time are well known to one of ordinary skill in the art and are based on the difference between a turn off time and the clock time. The program then selects the turn off slot with the least nonzero number of minutes, and loads the corresponding time into the alarm. The program then proceeds to step 325, the receiver on routines. The receiver on routines comprise well known decoder and battery saver algorithms as well as message handling and alert routines. Additionally, they contain routines to display the time of day and pager status on the display and modify the turn on and turn off times as well as enable and disable the automatic turn on and turn off function. Since a turn on or turn off time may be modified during step 325, the program proceeds to step 330 which checks to see if there has been and modification to the auto reset flag or a turn off time. If there has been no modifications, the program proceeds back to the receiver on routine 325 and continues. If the auto reset flag or a receiver off time has been modified, the program proceeds to step 320 to determine the next turn off and loads it into the alarm.

The receiver on routines 325 are occasionally interrupted 350 for various reasons. The interrupt source may be a turn off alarm generated by the clock 60, a manual request to turn the pager off generated by the power on/off switch 3, or a timer or peripheral interrupt. In the event of an interrupt 350, the program proceeds to process the interrupt. Interrupt processing is shown in the flow chart of FIG. 5B. The object of the flow chart is to determine the source of the interrupt and to respond accordingly. First, the receiver ON flag is checked to be set, step 355. Since the receiver ON flag is set in this case, the program proceeds to step 360 to see if the power switch has been pressed. If the power switch has not been pressed, the program proceeds to step 365, time to turn off. In the time to turn off step, the interrupt from the clock function 60 is checked. If the interrupt is present, register 66 from the clock is read and compared to the contents of the slot time determined by step 320. The minutes and hours times should match exactly, however, the day of week, date or month slot may not match. If the DV flag is set in the slot, the day of week information from the clock register 66 is compared to the day of week information from the turn off slot. If they are equal, the determination is made that it is time to turn the receiver off. If the DV flag is cleared in the slot, the date and month information in the turn off slot is valid, the date and month information in the turn off slot is compared with the date and month information in the clock. If equal, the program determines that it is time to turn off. If an interrupt was not delivered from the clock or if the determination was made not to turn the receiver off, then the program proceeds from step 365 to step 370 to determine if there were other sources of the interrupt. Typically, other interrupt sources will be a timer interrupt or other peripheral communication interrupts. The processing of such interrupts are well known to one of ordinary skill in the art. The program completes processing any remaining interrupts and returns from the interrupt 375 to the turn on routine 325 in FIG. 5A. However, if at step 365 it was determined that it was a valid time to turn off, the program proceeds to step 378, auto flag set. The auto flag set may be manually set or cleared at any time during the receiver on routines. If the auto flag is not set, the user desires manual control of turn on and turn off functions of the pager. Thus, if the flag is clear, the program proceeds to check and service any other interrupts, step 370, and return, step 375, to the receiver on routines, step 325. If, however, the user desires the pager to turn off at a predetermined time, the auto flag will be set at step 378 and the program proceeds to step "B" 380. Similarly, if the power switch was pressed in step 360, the program proceeds to step "C" 390. Step "B" 380 and step "C" 390 proceed to FIG. 5C.

Essentially, it has been shown the pager normal operating flow chart when the receiver is on. It has also been shown how the receiver goes through an interrupt service routine and either returns to the receiver "on" flow chart or proceeds to the receiver off flow chart. The receiver "off" flow chart will now be described.

Figure 5B:
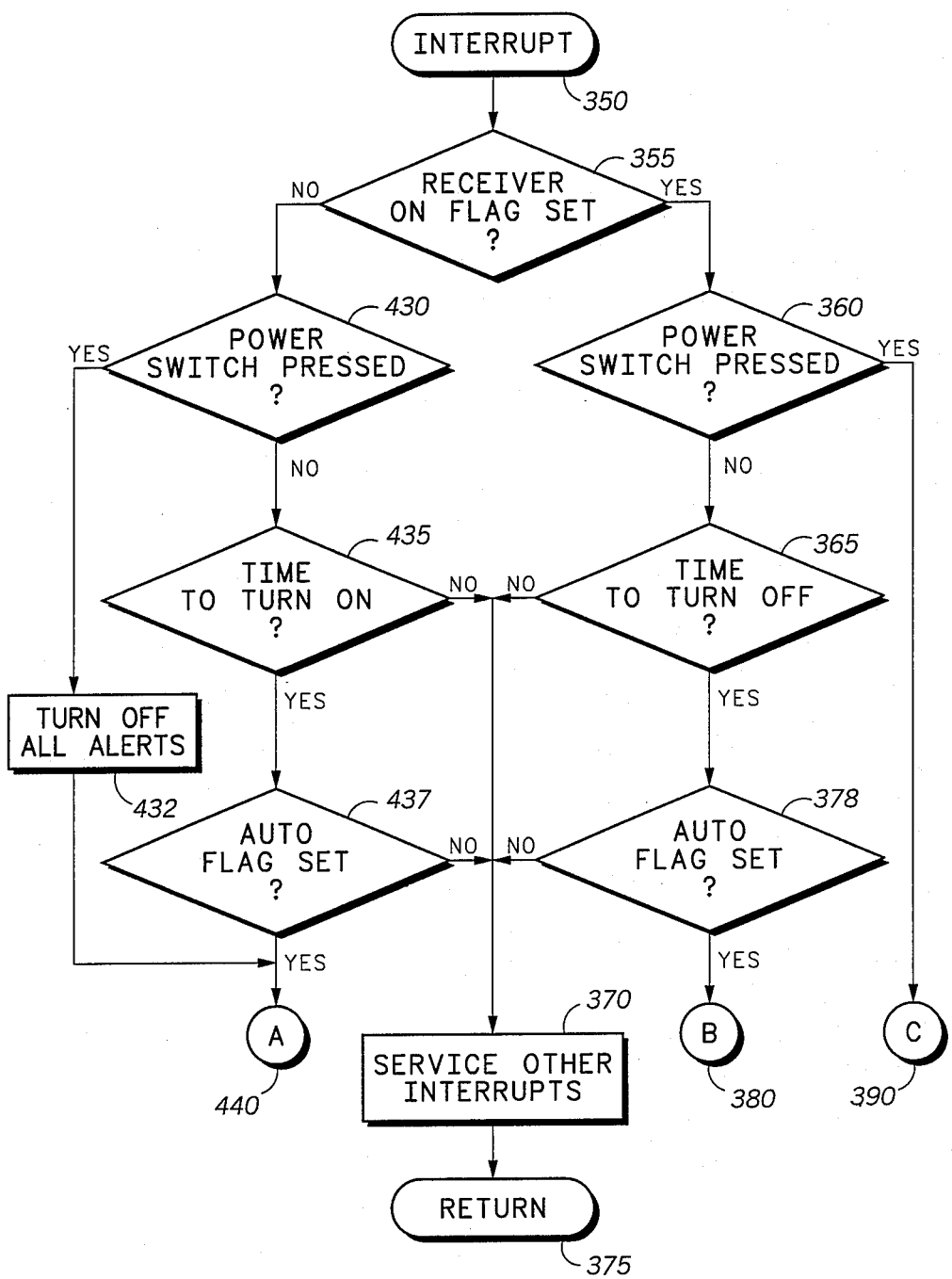
Figure 5C:
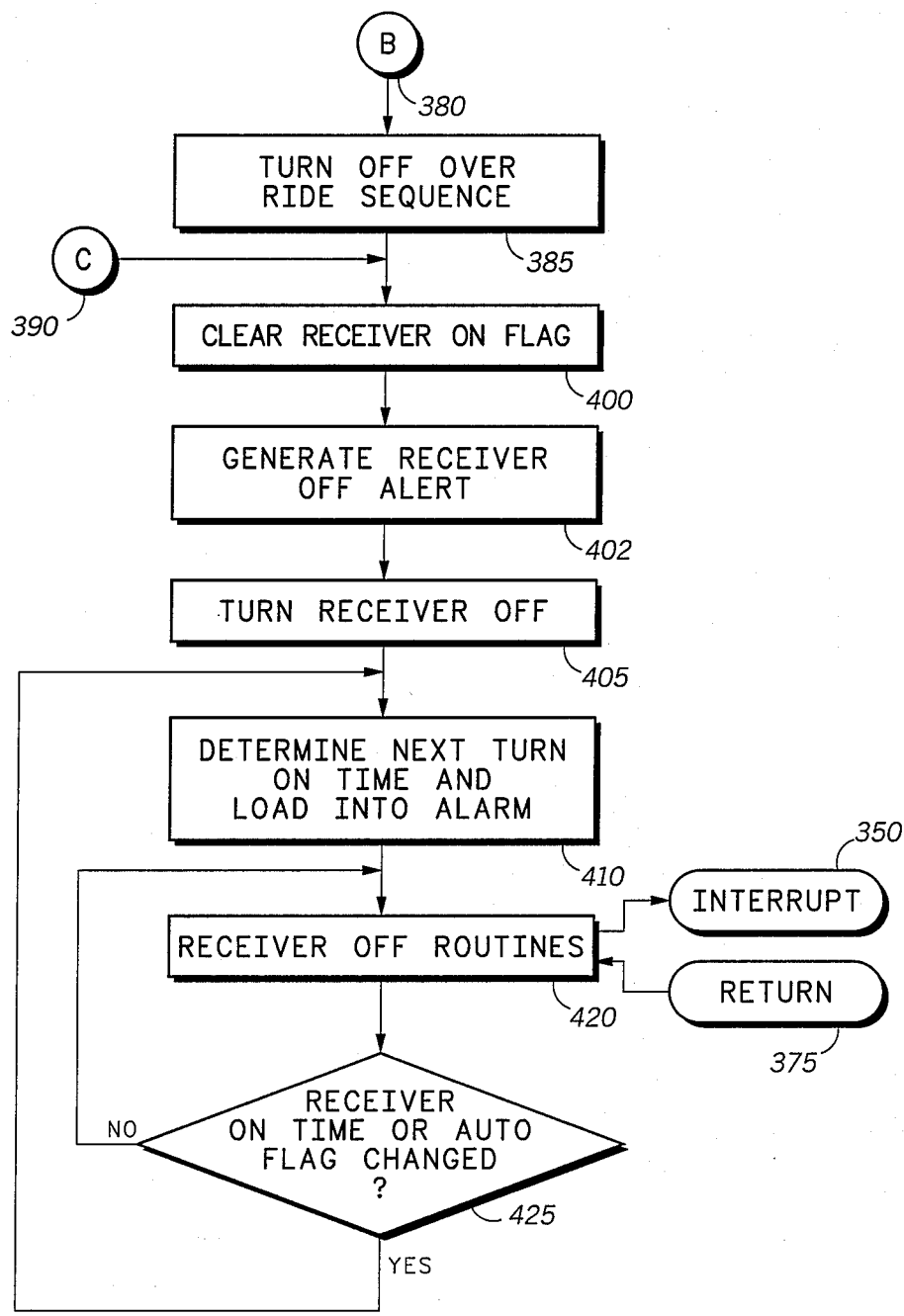

Turning now to FIG. 5C, the flow chart is entered from step "B" 380 which resulted from a turn off time being equal to the clock time, next a turn off override sequence is executed. The turn off override sequence is described in detail in FIG. 5D and allows the user to override the turn off time without interrupting the reception process. It can be appreciated that the turn off override sequence enhances the operation of the pager and may be eliminated if pager operation were simplified. Upon completion of the turn off override sequence 385, the program joins with step "C" 390 from FIG. 5B. The next step is to clear the receiver ON flag, step 400, generate a short receiver OFF alert, step 402, and turn the receiver off, step 405. Turning the receiver off disables all information reception and decoding until the receiver is turned back on. Additionally, necessary housekeeping functions are performed by the microcomputer to enter the receiver off mode. The program then proceeds to step 410 to determine the next turn on time and load the next turn on time into the alarm. Similar to the process in step 320, during step 410, the program scans the turn on and turn off slots, determines the number of minutes to the occurrence of the next time contained within a valid turn on slot, and selects the turn on slot time with the least number of minutes. This algorithm is well known to one of ordinary skill in the art. The program then loads the corresponding turn on time into the alarm. The program then proceeds to the next step 420, receiver off routines. Generally, the receiver off routines are low power routines which comprise tasks such as displaying the time and pager status information on the display as well as allowing the user to modify both the time information and the slot on/off information and enabling and disabling the automatic turn on and turn off mode. Since the auto reset flag or a turn on or turn off time may be modified during step 420, the receiver proceeds to step 425 to check if the auto reset flag has been toggled or a receiver on time is changed. If the auto reset flag or a receiver on time has not changed, the receiver proceeds back to step 420 to the receiver off routine. If the auto reset flag or a turn on time has been changed by manual modification of the turn on time by the user, the program proceeds to step 410 to determine the next turn on time and load it into the alarm. During the receiver turn off routines 420, an interrupt 350 may be generated. In the event of the interrupt, the program proceeds back to the interrupt handling routine in FIG. 5B.

Referring back to FIG. 5B, the interrupt enters at step 350. First, step 355 checks to see if the receiver ON flag is set. In this instance, the receiver on flag is clear and the program proceeds to step 430, the power switch pushed. If the power switch has not been pushed, the program proceeds to step 435 to check to see if it is time to turn on. As in the time to turn off 365 step, time to turn on step 435 checks to see if an interrupt came from the clock. If the interrupt came from the clock, the clock registers 66 are read and compared to the turn on time selected from step 410. If the times do not match as described in step 365, then the decision is made not to turn on and the program proceeds to step 370. Step 370 checks to see if there are other sources of the interrupt such as timer interrupts or peripheral communication interrupts and services the interrupts accordingly. The program then proceeds to step 375 to return from the interrupt service routine. Referring now to FIG. 5C, step 375 returns the program to the receiver off routines 420. Referring back to FIG. 5B, if the power switch was pressed in step 430, the program proceeds to step 432 to terminate any alert signal that may be generated at the time. The program then proceeds to step "A" 440. If the determination was made that it was time to turn off, step 435, the program then proceeds to step 437 to check the auto flag. Note that the auto flag may be manually set or cleared in the receiver off routines 420. If the auto flag is cleared, the user does not desire the pager to turn on at the predetermined time, the program proceeds through steps 370 and 375 as previously described and returns to the receive off routines. If the auto flag is set, the program proceeds to "A" 440. Referring back to FIG. 5A 440, the program proceeds to turn the receiver on, step 315 where the receiver is turned on and necessary housekeeping is performed to enter the receiver "on" mode. The program then proceeds with the flow chart in FIG. 5A as previously described.

Figure 5D:
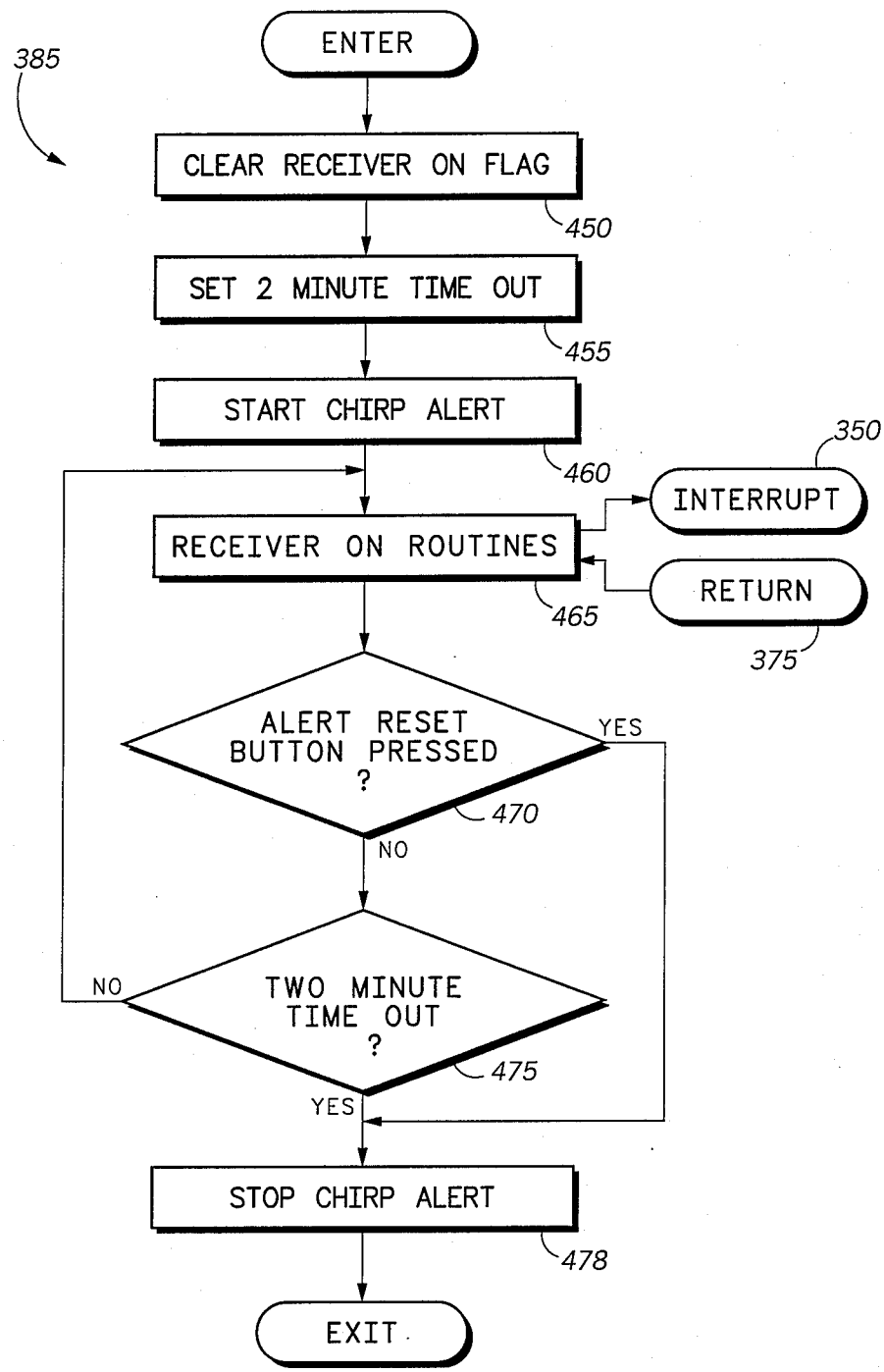

Turning now to FIG. 5D, FIG. 5D details the turn off override sequence, step 385, FIG. 5C. Upon entry, the receiver on flag is cleared, step 450. A two-minute timer is started, step 455, and a turn off override alert is initiated, step 460. The turn off override alert may be a 500 ms tone burst occurring every ten seconds. The alert may be accompanied by a visual indication such as displaying the "ON" annunciator 24 on and the "OFF" annunciator 24 flashing. The receiver ON routines 465 are executed. Note the receiver ON routines 465 are identical to the receiver ON routines 325. This continuous execution of receiver ON routines from step 325 to step 465 is maintained. The program then proceeds to step 470 to check if the alert reset button 5 has been pressed. If not pressed, the program proceeds to step 475 to check if the two-minute time has timed out. If not, the program proceeds back to the receiver ON routines 465. If in step 470 the alert reset button 5 has been pressed, the program stops the chirp alert step 478 and exits to step 400 of FIG. 5C. Similarly, if the two-minute timer has timed out, step 475, the program stops the chirp alert step 478 and exits to step 400, FIG. 5C. As previously explained, FIG. 5C details the receiver off routines. Thus, it has been shown that the manual override sequence will time out to the receiver OFF routines in two minutes if no action is taken or will execute the receiver off routines earlier if the alert reset button 5 is pressed.

The manual override sequence also provides for keeping the receiver on. Referring back to step 465, the receiver ON routines may be interrupted 350 as previously described. The program proceeds to check the receiver ON flag, step 355. In this case, the receiver ON flag is clear and the program proceeds to check if the power switch is pressed, step 430. If the power on switch is not pressed, the program proceeds to step 435, time to turn on. Since the turn off override sequence 385 is only executed for two minutes after a turn off alarm and a new time is not loaded into the alarm, the program will always proceed to step 370 and handle other interrupts step 370 and to return step 375 to the receiver ON routines, step 465. However, if the power switch is pressed at step 430, the program proceeds to step 432 to turn off all alerts. In this case, the alert chirp signal initiated step 460 would be terminated. The program then proceeds to step "A" 440 which returns to the receiver ON routines of FIG. 5A. Thus, it has been shown that activating the power switch during the turn off override sequence will return the program to the receiver ON routines, thereby overriding the power off time. This is accomplished without executing the receiver OFF routine. In this mode, the power switch acts to maintain power on state instead of toggling the power on/off state.

FIGS. 5A, 5B, 5C, and 5D have been detailed to describe the pager overall operation. FIG. 5A discloses the operation when the receiver is on, FIG. 5C shows the operation of the program when the receiver off, and FIG. 5B shows the interrupt service routine used for switching between the receiver on and receiver off flow charts. The receiver may switch from the receiver on mode to the receiver off mode either by manually pushing the power on/off switch or by the clock chip generating an alarm corresponding to a turn on or turn off time. Note that the alarm may be generated but the day of week or date information may not match the information programmed into the slot. In this event, the alarm is ignored and the pager proceeds on with the respective turn on or turn off routine. Additionally, it has been shown that the turn on time and turn off time functions may be enabled or defeating by enabling or defeated the automatic mode. FIG. 5D shows the operation of the turn off override sequence.

The turn on and turn off times may be programmed in a variety of ways. First, they can be preprogrammed into the pager and not variable, in which case the user would not be able to add, delete or modify the times. In this event, the memory means 40 could be a one-time programmable read only memory or the means to reprogram the reprogrammable nonvolatile memory 40 would be inhibited. Second, the turn on and turn off times may be added, modified or deleted by a series of key strokes on the pager. Third, the turn on and turn off times may be added, modified or deleted by data transmitted by a terminal and received and decoded by the paging receiver. Likewise, it is possible to have any combination of these three techniques within a paging device. The information in the slots for the turn on and turning off times may be programmed over the air. The process for this type of programming are contained in the receiver on routines 325. The sequence for modifying the slot times is described in U.S. patent application Ser. No. 07/116,948, entitled "System for Off-the-Air Reprogramming of Communication Receivers", filed by Davis et al. and assigned to the assignee of the present invention, which is hereby incorporated by reference.

Figure 6B:
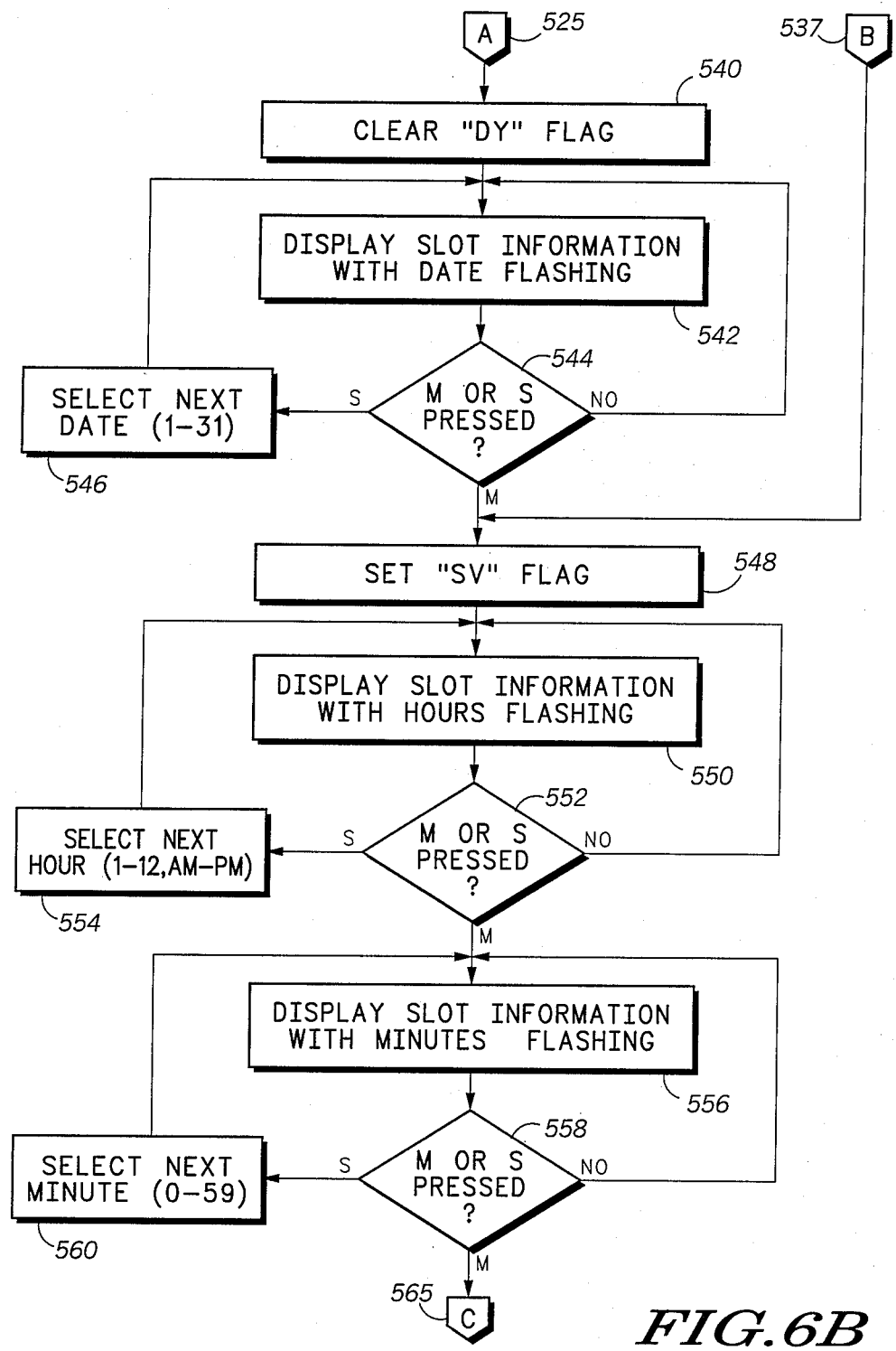

FIGS. 6A and 6B are detailed flow charts showing the program procedure allowing a user to manually set turn on and turn off times. This program resides in both the receiver on 325 and receiver off 420 routines. The normal execution of this program results in the constant display of time of day 500 on the display 12. When the time information is displayed on display 12, the contents of register 66 in the clock 60 is used for displaying. The hours and minutes information from the first and second registers of 66 are converted to AM/PM format and displayed on the corresponding segments 22 and the AM/PM indicator 23 are appropriately activated. The corresponding day specified by the third register of 66 is activated on segments 14. The month and date are determined from the fourth and fifth registers of 66 and displayed on segments 16. The determination is made if the receiver is on, step 325, or off, step 420, and the appropriate on/off indicator 24 is activated. The slot information segments 18 and 20 are not displayed when the time of day 500 is displayed.

The program frequently refers to the M or S switch. M refers to the menu switch 7 and S refers to the select switch 9. The program proceeds to step 502 to see if the M or S switch is pressed. If the M or S switch is not pressed, the program proceeds back to 500, display time of day. If the S switch is pressed, the program proceeds to step 504 to set the clock date and time. The program for setting the clock date and time is well known to those skilled in the art and is not necessary for the description of this invention and is not described herein.

If the M switch is pressed, the program performs a slot modification sequence wherein a slot time may be added, modified or deleted. The program proceeds to step 506 to select slot number 1. The program then proceeds to step 508 to display the slot information with slot number flashing. In this mode, the time of day display is terminated and the entire slot information is selected and displayed on display 12 with the slot number flashing. When the slot information is displayed on display 12, the contents of the selected slot from the reprogrammable nonvolatile memory 40 is used for displaying. The hours and minutes information from the first and second registers of the selected slot are converted to AM/PM format and displayed on the corresponding segments 22 and the AM/PM indicator 23 appropriately activated. The corresponding day specified by the third register of the selected slot is activated on segments 14. The month and date are determined from the fourth and fifth registers of the selected slot and displayed on segments 16. The determination is made if the receiver is on, step 325, or off, step 420, and the appropriate on/off indicator 24 is activated. The slot number is determined by steps 506 and 512 and displayed on segments 18. The slot number flashing indicates that the slot number may be modified.

The program then proceeds to step 510 to see if the M or S button has been pressed. If neither of buttons has been pressed, the program proceeds back to step 508. If the S button has been pressed, the program proceeds to step 512 to select the next slot. The program then proceeds back to step 508 to display the information of the next slot selected. Note in step 512 that slot 1 is selected again after the last or Nth slot has been displayed. Back at step 510, if the M button is pressed, the program proceeds to display slot information with slot on/off flashing 513. The program then proceeds to 514 to see if the M or S buttons have been pressed. If neither have been pressed, the program returns to step 513. If the S button has been pressed, the slot on/off indicators is toggled which means that if the slot previously was an "off" slot, it is changed to an "on" slot. Consequently, if the slot was an "on" slot, it is changed to an "off" slot. The program then proceeds back to step 513. The toggling of the on and off display on step 516 also toggles the on flag in the second register of the slot. In step 514, if the M button is pressed, the program proceeds to step 518 to display slot information with month flashing. Step 520 checks to see if the M or S button is pressed. If neither are pressed, the program proceeds back to step 518. If the S button is pressed, the next month is selected. The months range from 0 through 12 in step 522. Step 522 proceeds back to 518 to display the month. In step 520, the program proceeds to step 524 if the M button is pressed. In step 524, if the month equals zero, it indicates that the day of week is desired. If the month does not equal zero, it indicates that the month is valid and the day of week should not be modified. If in step 524 the month does not equal zero, the program proceeds to "A", step 525. If the month equals zero, the program proceeds to step 526 wherein the day flag on the third register of the slot is set indicating that the day information is to be used for the slot. Step 528 displays the slot information with the day flashing. The program then proceeds to step 530 to check if the M or S flag is set. If neither are set, the program proceeds back to step 528. If the S flag is set, the program proceeds to step 532 to select the next day, Sunday through Saturday or "none". The selection of "none" eventually allows the user to disable the slot. After step 532, the program proceeds back to step 528. At step 530, if the M flag is set, the program proceeds to step 534 to check to see if the day equal to "none" was selected. If day does not equal "none", then the program proceeds to "B" step 537. If the day equals "none" in step 534, the program proceeds to step 536. Note that the only way to reach step 536 is to have the month equal to zero and the day equal to zero. This indicates that the user is deleting the slot time, in which case the SV flag is cleared. Also, the hours are cleared and the minutes are cleared deactivating the slot entirely. The program then proceeds back to step 500 to display the time of day.

Turning now to FIG. 6B, the program enters at "A", step 525, and proceeds to step 540 to clear the DV flag in bit 7 of the third register of the slot indicating that date information is desired. The program then proceeds to step 542 to display slot information with date flashing. The program then proceeds to step 544 to see if the M or S button is pressed. If neither is pressed, the program proceeds back to step 542. If the S button is pressed, the program proceeds to step 546 to select the next date, the date going from numerals 1 through 31 and back to 1. After step 530, the program proceeds back to step 526. If in step 544 the M button is pressed, the program proceeds to step 548 to set the SV flag in the first register of the slot.

Referring back to step 534, if the day does not equal "none", the program proceeds to "B", step 537 which then proceeds to step 548 to set the SV flag. The program then proceeds to step 550 to display slot information with the hours flashing. The program proceeds to step 552 to check if the M or S flag has been pressed. If neither have been pressed, the program proceeds back to step 552. If the S flag is pressed, the program proceeds to step 554 to select the next hour, the hours ranging from 1 through 12 and the AM or PM. After step 554, the program proceeds back to step 550. If at step 552, the M flag is pressed, the program proceeds to step 556 to display the slot information with the minutes flashing. The program then proceeds to step 558 to see if the M or S has been pressed. If neither have been pressed, the program proceeds back to step 556. If the S button has been pressed, the program proceeds to step 560 to select the next minute zero through 59 and then proceeds back to step 556. If at step 558 the M flag is pressed, the programming of the slot has been completed and the program proceeds to "C" step 565 which returns to step 500 to display the time of day.

Figure 7:
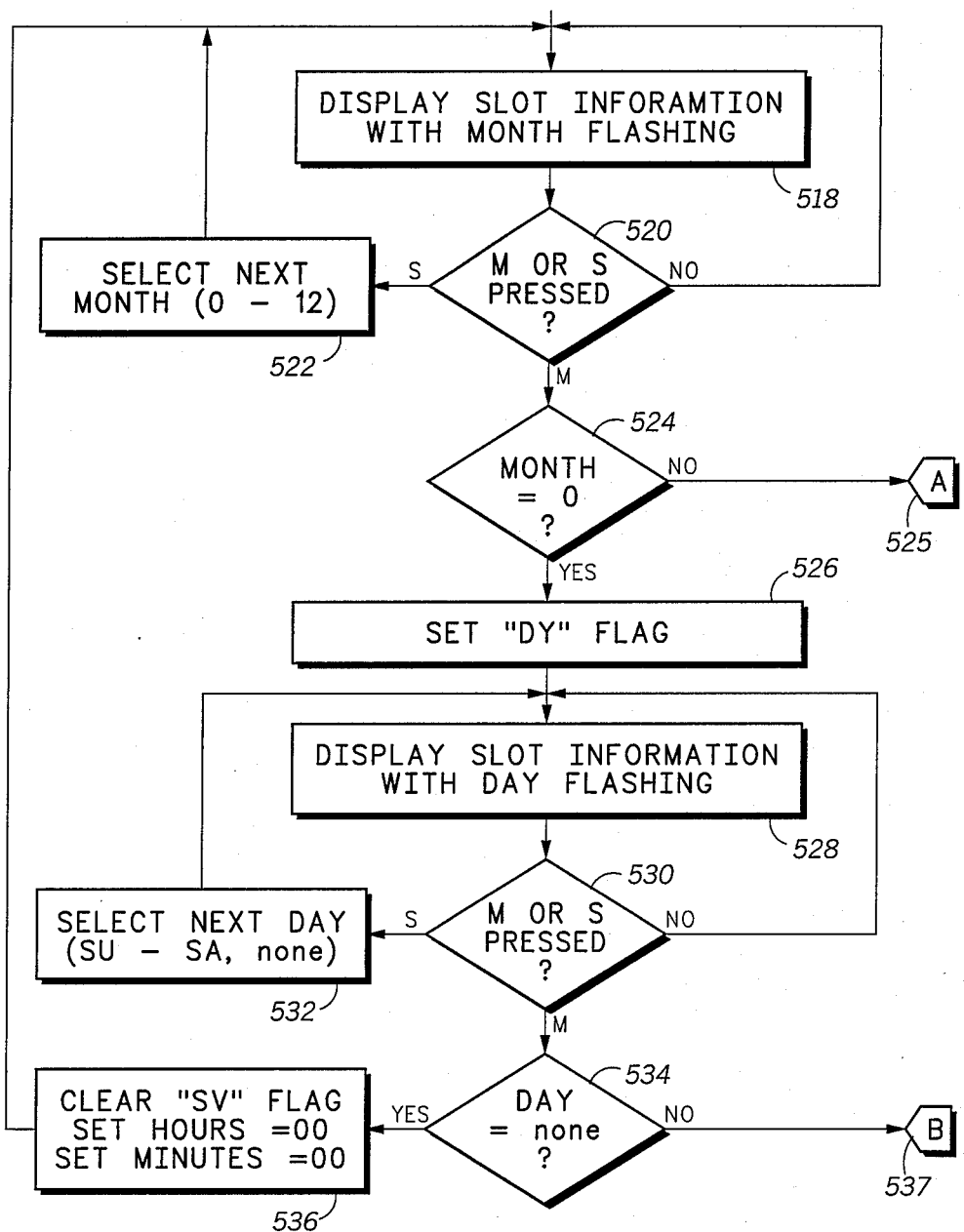
FIG. 7 is a flow chart showing the automatic mode enabling and disabling sequence.
Figure 7:
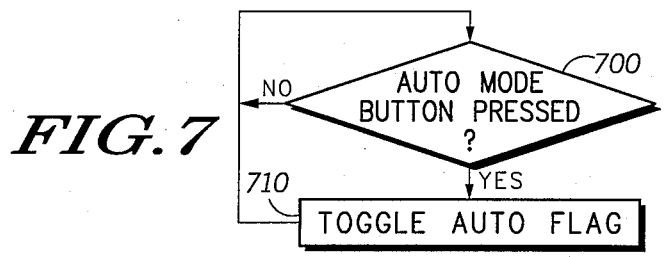

Turning now to FIG. 7, FIG. 7 shows the flow chart for modifying the automatic mode. This flow chart operates in both the receiver on routines step 225 and receiver off routines step 420. The operation is simply toggle the auto mode flag when the auto mode button is pressed. The program check for the auto mode button to be pressed, step 700. If not pressed the program returns, step 700. If the auto mode button is pressed the program toggles the auto flag, step 710. If the auto flag is set, step 710 will clear it, if cleared, step 710 will set it. Setting the auto flag also activates the auto annunciator 24 on the display while clearing it blanks the auto annunciator 24.

To summarize the operation of the present invention, the device is a selective call receiver capable of turning on or off at predetermined times. The times may be preprogrammed, manually entered or programmed over the radio link. Additionally, the device may be manually turned on or off by the user. Furthermore, a means is provided so that the user may override a turn off time without interrupting reception of paging information.

It can be appreciated that this invention, although described in the embodiment of a paging device, may be implemented on a variety of selective call receiving devices. Additionally, one of ordinary skill in the art may realize a variety of alternate implementations exist and that may remain within the spirit and scope of this invention.

What is claimed is:

1. A multistate selective call receiver capable of receiving and processing modulated information in a high power consumption state of power on or in an alternative, inhibiting the receiving and processing of the modulated information, thereby operating in a lower power consumption state of power off, the power on and power off consumption state selection being dependent upon time of day, said receiver comprising;
   timekeeping means for generating a time signal including time of may information;
   memory means for storing at least one power on time and at least one power off time, both including time of day information;
   comparison means coupled to said timekeeping means and the memory means for generating a power on request signal, wherein the power on request signal is generated when the time signal equals any of the power on times and the power on request signal is terminated only when the time signal equals any of the power off times;
   power control means for providing operating power solely in response to the presence of the power on request signal; and
   receiving means responsive to the operating power and coupled to the power control means for receiving and processing modulated information.

2. The multistate selective call receiver recited in claim 1 wherein the modulated information comprises an address portion, the selective call receiver being capable of receiving and processing the address portion and generating an alert signal when the address portion closely matches a predetermined address particular to the selective call receiver.

3. The multistate selective call receiver recited in claim 1 further comprising:
   display means for interpreting the time signal and displaying information contained in the time signal in a readable manner.

4. The multistate selective call receiver recited in claim 1 further comprising:
   switch means for generating a manual power on request signal, wherein the switch is manually activated by the operator of the multistate selective call receiver; and
   the power control means additionally being responsive to the manual power on request signal thereby providing operating power for the receiving means.

5. The multistate selective call receiver recited in claim 1 wherein:
   the timekeeping means further generates a time signal comprising day of week, date and month information fields;
   the first memory means stores at least one power on time and at least one power off time wherein each power on and power off time may specify any combination of time of day, day of week, date and month information fields; and
   the comparison means being responsive to the time signal, and the power on times and the power off times, wherein the power on request signal is generated when all of the specified information fields in any of the power on times equals the corresponding information fields in the time signal and the power on request signal is terminated only when all of the information fields specified in any of the power off times equal the corresponding information fields in the time of day signal.

6. The multistate selective call receiver as recited in claim 1 wherein the power on and power off times are predetermined and the memory means includes a PROM (programmable read only memory) for storage of said predetermined power on and power off times.

7. The multistate selective call receiver as recited in claim 1 further comprising:
   switch means for manual entry of power on and power off times; and
   setting means responsive to the switch means for loading and modifying the power on and power off times in the memory means.

8. The multistate selective call receiver as recited in claim 7 further comprising:
   display means for displaying readable information; and
   the setting means further controlling the display means during the manual entry of the power on and power off times for readable verification of the manually entered power on and power off times.

9. The multistate selective call receiver recited in claim 2 wherein the modulated information further includes an information portion comprising modified or additional power on and power off times, the multistate selective call receiver being capable of receiving and processing the information portion and further comprising:

setting means responsive to the received and processed power on and power off time information, wherein the setting means deletes, adds or modifies the corresponding power on and power off times in the memory means.

10. The multistate selective call receiver recited in claim 2 further comprising:

alert generating means responsive to the alert signal for generating a sensible alert indicating that an address has been decoded.

11. The selective call receiver recited in claim 10 wherein the sensible alert is audible.

12. The multistate selective call receiver recited in claim 10 wherein the alert generating means being additional responsive to the comparison means, generates a signal in response to a state change of the power on request signal.

13. The multistate selective call receiver recited in claim 1 further comprising:

a delay means responsive to the comparison means for sustaining the power on request signal beyond a power off time for a predetermined delay; and a signalling means responsive to the delaying means for indicating the impending termination of the power on request signal wherein the power on request signal is terminated upon expiration of the predetermined delay.

14. The multistate selective call receiver recited in claim 13 further comprising a manual resetting means coupled to the delay means for terminating the power on request signal upon activation of said manual resetting means prior to the expiration of the predetermined delay, thereby terminating the indication of the signalling means.

15. The multistate selective call receiver recited in claim 13 further comprising a manual overriding means coupled to the delay means for maintaining the power on request signal until the occurrence of a subsequent power off time, the maintenance occurring when the manual overriding means is operated during the predetermined delay.

16. The multistate selective call receiver recited in claim 1 further comprising:

switching means for generating a mode signal, wherein the switch is manually activated by the operator of the multistate selective call receiver; and the power control means being additionally responsive to the switching means for enabling response to the comparison means when the mode signal is present and for inhibiting responses to the comparison means in the absence of the mode signal, wherein the power control means maintains the state of the receiver upon the absence of the mode signal.

17. A method of switching a selective call receiver on or off dependent upon time of day comprising the steps of:

(a) generating a time signal within a clock means;

(b) comparing the time signals to a set of predetermined power on and power off times stored in a memory means;

(c) switching a receiving means on when the time signal corresponds to a power on time;

(d) receiving and processing modulated information;

(e) battery saving the receiving means when the receiving means is on;

(f) switching the receiving means off when the time signal corresponds to a power off time; and (g) repeating steps (c) through (f) indefinitely.

18. The method of claim 17 wherein step (d) of receiving and processing further comprises:

decoding selective call addresses from the modulated information;

comparing the address to a predetermined address; and generating an alert signal when a decoded address closely matches the predetermined address.

19. The method of claim 17 further comprising the step of:

displaying the time signal of step (a) in a readable manner.

20. The method of claim 17 further comprising the steps of:

switching the receiving means on in response to a manual input; and switching the receiving means off in response to a manual input.

21. The method of claim 17 wherein the predetermined times once programmed are not modifiable.

22. The method of claim 17 further including the step of:

manually modifying the predetermined times via entry means included within the selective call receiver.

23. The method of claim 17 further including the steps of:

decoding power on and power off times from the modulated signal; and modifying the predetermined power on times and power off times with the decoded power on and power off times.

24. The method of claim 17 including the steps of:

delaying for a predetermined delay time the switching off of the receiving means when the time signal corresponds to a power off time; and indicating the impending switching off of the receiving means for the duration of the predetermined delay time; and switching off the receiver means upon expiration of the predetermined delay time.

25. The method of claim 24 including the steps of:

suspending the step of delaying upon activation of a manual resetting means prior to the expiration of the predetermined delay time; and causing the receiver means to be switched off upon suspension of the step of delaying.

26. The method of claim 24 including the step of:

maintaining the step of delaying beyond the predetermined time delay upon activation of a manual overriding means, such delay continuing until the time signal corresponds to a subsequent power off time.

* * * * *

Disclaimer 4,860,005.—*Joan S. DeLuca; Randi L. Dulaney*, both of Boca Raton, Fla. COMMUNICATION RECEIVER WITH AUTOMATIC TURN ON/OFF. Patent dated Aug. 22, 1989. Disclaimer filed Nov. 20, 1989, by the assignee, Motorola, Inc.

The term of this patent subsequent to Aug. 22, 2006, has been disclaimed.
[*Official Gazette January 16, 1990*]